(No Model.)
C. C. STUART.
LATHE.
No. 268,439. Patented Dec. 5, 1882.
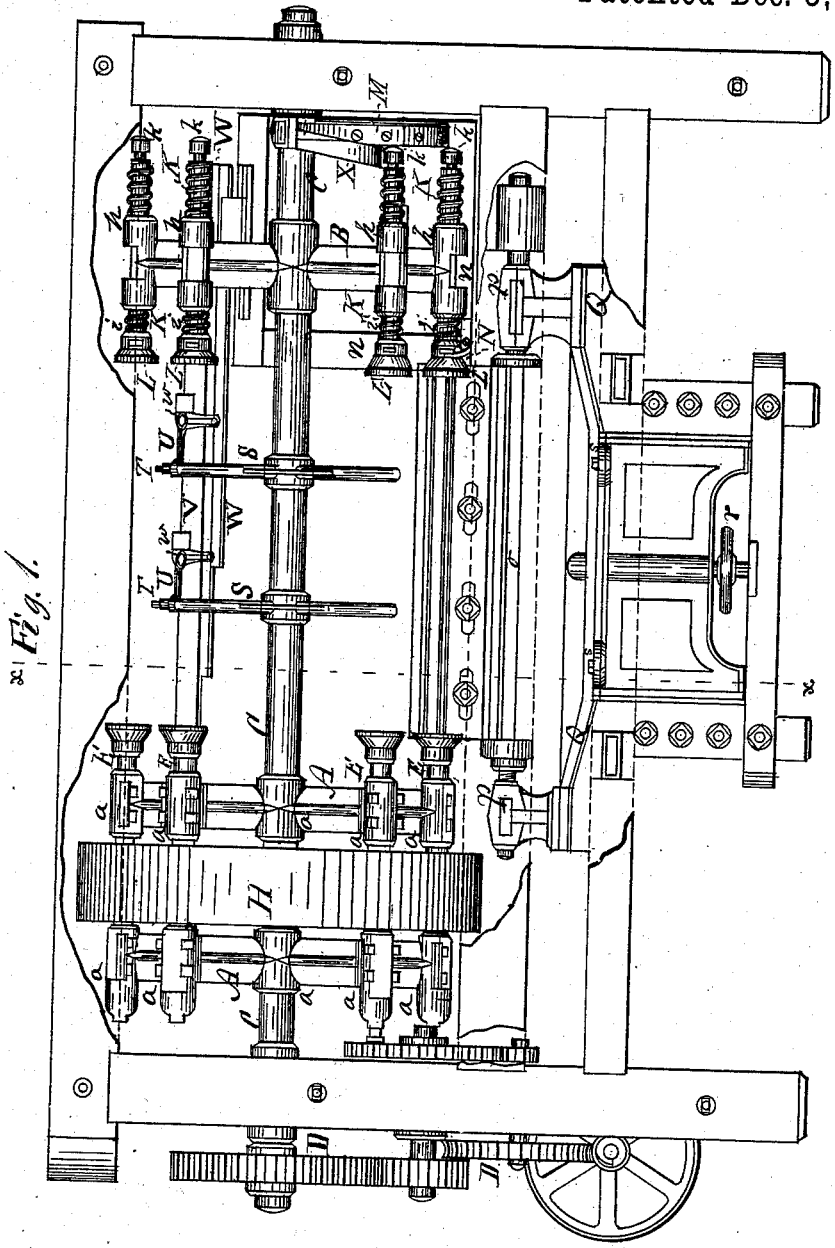
WITNESSES
W. A. Jones
J. S. Brown,
INVENTOR
Charles C. Stuart.
By J. B. Lawyer
Attorney (No Model.)
3 Sheets—Sheet 2.
C. C. STUART.
LATHE.
No. 268,439.
Patented Dec. 5, 1882.
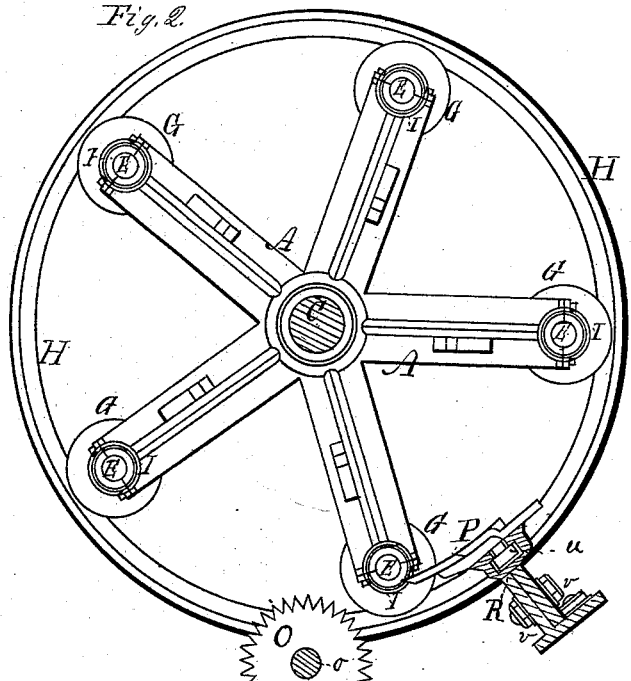
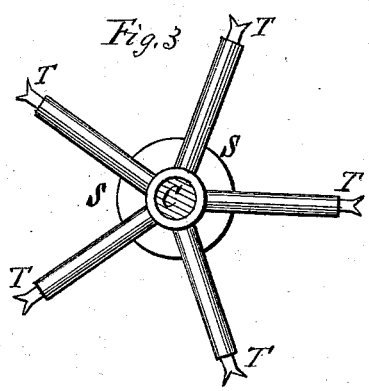
WITNESSES.
W. O. Jones
J. T. Brown
INVENTOR.
Charles C. Stuart
By J. B. Lawyer
Attorney.

(No Model.)

3 Sheets—Sheet 3.

C. C. STUART.
LATHE.

No. 268,439.

Patented Dec. 5, 1882.

WITNESSES
W. A. Jones
J. S. Brown

INVENTOR
Charles C. Stuart,
By J. B. Lawyer
Attorney

UNITED STATES PATENT OFFICE.

CHARLES C. STUART, OF HAMMONTON, NEW JERSEY.

LATHE.

SPECIFICATION forming part of Letters Patent No. 268,439, dated December 5, 1882.

Application filed May 20, 1882. (No model.)

*To all whom it may concern:*

Be it known that I, CHARLES C. STUART, a citizen of the United States, residing at Hammonton, in the county of Atlantic and State of New Jersey, have invented certain new and useful Improvements in Lathes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification—

Figure 1 being a side view of the lathe; Fig. 2, a cross-section, as in a plane indicated by the line $x\ x$, Fig. 1, not showing the frame, and showing only the principal parts of the lathe in that view; Fig. 3, a view transverse to the machine, showing one of the parts thereof; Figs. 4, 5, 6, 7, 8, and 9, detail views of parts detached.

Like letters designate corresponding parts in all of the figures.

My improvements belong to the class of "planetary" lathes in which there are a considerable number of centers to hold at once the same number of pieces to be turned, the said holding-centers being equidistant from a common center around which all turn, and thereby bring the pieces successively to rough-forming and smoothing cutters, each piece being caused to revolve on its center while being carried around, and the pieces being placed in the lathe rough-formed, smoothed, and discharged from the machine successively and automatically, except placing the pieces one by one in the lathe.

My improvements are designed to perfect the action of the several functional parts of such a lathe, to adapt it to work of various dimensions, to obviate the liability of injuring work, and to make the operation of the lathe rapid and render the machine capable of doing a large amount of work in a given time.

Figure 4:
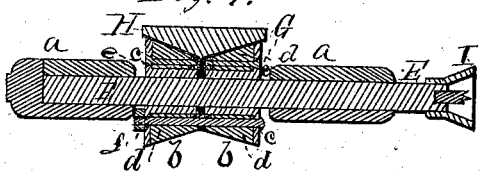
Figure 6:

For arranging and mounting the planetary centers two "spiders" or radial frames, A A B, are placed upon a central shaft, C, to which a comparatively slow revolving movement is communicated through suitable gearing, D, Fig. 1, from the driving-power. The head frames or spider A A carry the driving or mandrel shafts E E of the several turning-centers, the said spiders being placed at a little distance apart, as shown in Fig. 1, and being substantially alike. Each shaft E has a bearing, $a$, in each of these two spiders, as shown by the detail section, Fig. 4, the respective bearings forming a part of the spiders. Between these bearings each mandrel-shaft has fast upon it a pulley, G, Fig. 4, by which the shaft is caused to revolve, both for presenting different sides of each piece to be turned to the roughening-cutters and to produce the finishing operation thereon against the stationary smoothing-cutter. All of the mandrel-shafts are caused to revolve at equal speeds and simultaneously by the following special means devised by me: The several pulleys are preferably made smallest at the middle, tapering from the two ends toward the middle, or otherwise equivalently formed to receive and retain in place around and in contact with all the pulleys a ring-driver, H, which receives a revolving motion immediately from a driving-belt passing around its periphery, and which by frictional contact with the peripheries of the pulleys imparts a revolving motion to them. This ring-driver makes a simpler application of the power to the several mandrel-shafts than by means of belts, and especially it enables the frictional contact with the pulleys of the said shafts to be more perfectly equalized, and therefore more uniform action and better work to be produced. In order to increase the frictional contact between the inner surface of the ring-driver, which has a form to fit the whole width of the pulleys, as seen in Fig. 4, I make the periphery of each pulley of leather or other suitable comparatively soft and yielding surface. A peculiar construction of the said pulleys for this purpose I have invented, as shown in the said Fig. 4. Each pulley is made in halves $b\ b$, meeting each other in a plane at right angles to the axis of the same, each half being composed of a double-flanged skeleton-pulley, $c$, filled in with the leather $d$, secured in place by screws or bolts $e\ e$, if necessary or desired, and the two halves are then bolted together by bolts $f$, one of which is seen in Fig. 4. By this construction not only is the ring-driver held in place on the pulleys, but with the form of pulleys shown the driver is thereby readily mounted in place, the two halves of the pulleys being bolted together after the ring-driver is placed in position. The double conical form of each pulley also enables the ring-driver to be tightened at will on the pulleys by having sufficient open space between the two halves thereof, so that the bolts $ff$ can be made to tighten them up to the inner surface of the driver. Instead of having the yielding frictional surface on the pulleys, it might be on the inner surface of the ring-driver, but not so well as on the pulleys.

On the end of each mandrel shaft or spindle E is a conical or flaring cup or sleeve, I, the purpose of which is to center the pieces to be turned, when entered therein, without care on the part of the attendant, the flaring cup projecting forward from the shaft and beyond the holding-points $g$ of the shaft. These cups may be fixed on their respective shafts, or have a sliding movement back on the same, for allowing the pieces to be turned to the extreme end and for automatically discharging the turned pieces from the lathe.

Figure 5:
Figure 9:
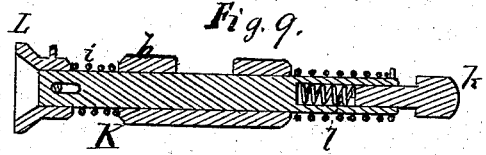

At the foot end of the lathe a single spider B is sufficient to carry the foot-spindles K K, which slide endwise, but do not necessarily turn in their bearings $h\ h$, which are secured upon the ends of the radial arms of the spider. The sliding movement of these spindles in their bearings is for the purpose of yielding back for admitting the pieces to be turned, and then forcing the shafts up to cause the pieces to be coupled to the mandrel-shafts at the other end of the lathe. The spindles also have flaring cups L L, similar to those of the mandrel-shafts, and for a similar purpose. They have a sliding movement back on the spindles, and are kept pushed out over the end of the pieces to be turned, during the securing thereof, by coiled springs $i\ i$ on the spindles or equivalent means. When the attendant is to put a piece in the lathe to be turned he first enters one end thereof in the proper mandrel-cup I at the head of the lathe, and then draws back the corresponding cup, L, at the foot of the lathe, to place the piece in line before it, and then lets the cup spring out over its end, thereby securing the piece in position. An additional movement is then required to couple the piece to the mandrel-shaft, and this is automatically effected by the machine as the piece is carried round from the place where it is entered by the attendant toward the cutters. The means I employ for this purpose is as follows: A cam-plate, M, Fig. 1, is mounted on a semicircular holder, secured in the proper position on the main shaft or axis C of the entire planetary mechanism to some fixed part of the frame. The position and form of this cam are such that as the rear projecting ends of the spindles K K are brought round they strike the edge of the cam, and are gradually forced forward sufficiently for the purpose. This cam is adjustable in position to regulate this movement. An essential point in this operation is to allow a yielding of any spindle in case any piece is a little too long or its material is too hard to admit the prongs of the mandrel-shaft to their full depth, since the action of the cam is positive unless the cam itself is made elastically yielding, which is objectionable. I accomplish this by making the rear ends, $k\ k$, of the spindles separate pieces, one end thereof fitting in holes or sockets in the spindles, and having a coiled spring, $l$, beyond each, as shown in Fig. 5. The springs are strong enough not to yield unless an obstruction renders it necessary. The outer ends of the pieces $k\ k$ may have friction-rollers thereon to ride on the cam M without resistance or unnecessary wear.

In order to automatically discharge the pieces from the lathe after they have been turned therein, a cam, N, secured to a part, $n$, of the frame, is so placed as at the proper time to draw back the cups L L, acting on projections upon the cups, as shown, and at or about the same time the rear ends of the spindles leave the cam M, and are then forced back by their springs, so as to drop the pieces therefrom. The cups I I on the mandrel-shafts may also be similarly withdrawn; but I prefer to give a positive motion to the cups, if at all, by a cam or cam-groove reaching around the circuit of their movement. I have not represented the device in the drawings. The spiders carry the pieces successively round to the cutters, first to the roughing-cutters O, which I have not represented in Fig. 1, but which are mounted on the shaft $o$, to which a revolving motion is imparted at the pulley thereon. These cutters are a series of saws placed side by side on the shaft, and of varying diameter, (if the form of the articles to be turned is not simply cylindrical,) so as to roughly cut the pieces nearly to the ultimate form and size required, and thus leave as little cutting for the stationary cutter P to do as practicable.

Figure 8:
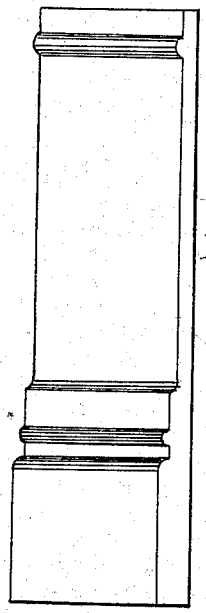
Figure 7:
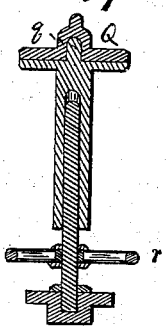

The cutter-shaft $o$ is mounted in bearings $p\ p$ on a frame or bar, Q, which has an adjusting movement, swinging on a central pivot, $q$, Fig. 7, projecting up from the supporting-frame Q, which is itself adjustable up and down by a screw, $r$. The said bar Q is secured in any required position parallel with the axis of the revolving pieces or obliquely thereto by means of set-screws $s\ s$, Fig. 6, and slots $t\ t$, as shown. Thus I can advance one end of the cutter-shaft and of the combined cutters therewith, so that they shall not all at once take hold of the piece, (which might produce a too violent action thereon and do some damage,) but gradually from end to end. The cutters singly may be changed for different forms of turned work to be produced; or the whole compound cutter may be changed bodily for the same purpose. The pieces are then carried round to the smoothing or finishing cutter P, which is stationary, the revolving motion imparted to the pieces themselves, together with their planetary motion, serving for all the movement required. The construction of this stationary smoothing-knife is peculiar, as shown in Figs. 2 and 8, the latter showing an edge and inside view of one form thereof. The shape to be given the pieces to be turned is determined by the form of the inner surface of the knife instead of that of the cutting-edge, which is ordinarily the case; and this inner surface of the knife is curved in the arcs of circles coincident with the paths of the tangential surfaces of the pieces as they pass by the knife, and consequently concentric with the central shaft of the spiders which bring the pieces round to the said knife. Therefore the inner surface of the knife has many lines and planes at different distances from the center of the spider's motion, all of which are curved to be concentric therewith. Thus, once for all, the form and position of the knife are determined, and the knife is sharpened by simply grinding the edge in a plane, so that, however much the knife may be worn away by grinding, the proper form and position of the knife will constantly be maintained, and no skill or special care is required in setting and sharpening the same. The knife is attached to the holder R (which is attached to or is made a part of the frame of the lathe) by having a back flange, $u$, fit in a T-shaped or equivalent form of groove, as seen in Fig. 2, and tightening thereon by thumb-screws $v\ v$. I provide self-adjusting back-rests for the pieces to be turned by the following construction: One, two, or more rest-spiders, S S, (two being shown in Fig. 1,) are secured to the main shaft C in any desired position thereon. There are as many radial arms to these rest-spiders as to the head and foot spiders, as will be seen by comparing Figs. 2 and 3, the latter representing a side view of one of these spiders. In the outer end of each radial arm thereof is a socket for holding the rests T T, to be carried around back of the pieces to be turned. Each rest is coupled to one end of a right-angled or bell-crank lever, U, which is pivoted at $w$ to a bar, V, reaching from one of the arms of a head-spider, A, to one arm of the foot-spider, there being one bar for each arm of the spiders, as shown in Fig. 2. The other end of each bell-crank lever is pivoted to a sliding rod, W, which has a sliding movement under its bar, there being a set of such rods for each back-rest spider, two sets being shown in Fig. 2. By this construction the sliding of the rods inward moves the rests T T outward, and vice versa. Where the piece to be turned is inserted the rods are in position to hold the back-rests well into their sockets, so as not to interfere with the insertion of the piece. Then as the revolution of the spiders brings the rests round to the roughing-cutters these rods are caused to slide inward, thereby moving the rests outward to touch the pieces as they are being reduced; and, if desired, the rests may be further thrust outward to hold the pieces opposite to the finishing-cutter. To automatically thrust these rests outward by sliding the rods W inward, a stationary cam, X, Fig. 1, is located in the proper position and made of the proper form for the outer ends of the rods to pass in contact with. After the rests pass by the cutters their rods pass beyond the cam, and they may then be driven outward by springs arranged in any suitable way.

The construction of the lathe above specified not only has the advantages and fulfills the purposes set forth, but has the following special capability: The foot-spider and the cams M, N, and X, which co-operate with it, are adjustable along the central shaft, C, to different positions on and along the central shaft, C, whereby the lathe is adapted to pieces of any length within the limit of its own extreme length, and still all the functions of the machine are performed efficiently. The roughing-cutter, made up of many saws, is correspondingly capable of lengthening and shortening; and the smoothing-cutter, by being made up of sections, may have the same capability; but ordinarily a smoothing-cutter may be made whole for each kind and length of work. The back-rest spiders also are movable at will on the shaft C, and tightened in any position thereon by set-screws; or they may be moved up to the driving-spiders out of the way of the pieces being turned when their use is not necessary or desired, instead of requiring their removal.

What I claim as my invention, and desire to secure by Letters Patent, is—

1. In a lathe, the combination, with the series of concentric mandrel-shafts E E, of the ring driver H, carried and held in place by the pulleys G G of the said shafts, substantially as and for the purpose herein specified.

2. In a lathe, the combination of the pulleys G G of the mandrel-shafts E E, each pulley constructed in two parts, tapering toward the middle of the pulley, and the ring-driver H, formed on its inner surface to fit the peripheries of the said pulleys, substantially as and for the purpose herein specified.

3. In a lathe, the combination of the pulleys G G of the mandrel-shafts E E, each pulley formed in two tapering parts, adjustable toward each other, and having peripheries of a soft material, and the ring-driver H, formed on its inner surface to fit the peripheries of the said pulleys, substantially as and for the purpose herein specified.

4. In a lathe, the combination, with the mandrel-shafts E E on the head or driver, of the foot-spindles K K, having springs to force them outward from the head-shafts, and the cups L L on the said spindles, having springs to force them inward toward the head-shafts, substantially as and for the purpose herein specified.

5. The foot-spindles K K, having the separate movable pieces $k\ k$ in their outer ends, and fitting in sockets thereof, with springs $l\ l$ to push the parts outward, in combination with the stationary cam M, substantially as and for the purpose herein specified.

6. In a lathe, the combination, with a head spider or spiders fixed on the central shaft for carrying a series of mandrel-shafts, of a foot-spider carrying a series of foot-spindles, adjustable on the central shaft to different distances from the head spider or spiders, cams for controlling the operation of the foot-spindles, also adjustable to different distances from the said head spider or spiders, and one or more back-rest spiders, T T, adjustable to various positions on the central shaft in relation to the head and foot spiders, and provided with radially-adjustable socket-arms, all substantially as and for the purpose herein specified.

7. The combination of the back-rests T T, bell-crank levers U U, sliding rods W, and cam X, substantially as and for the purpose herein specified.

8. In a planetary lathe, the combination of a head spider or spiders carrying concentric mandrel-shafts, a foot-spider carrying concentric foot-spindles, a roughing cutter or cutters constructed to roughly shape the articles to be turned, and a smoothing-cutter formed to finish the articles roughly shaped by the roughing-cutters, and having its cutting-surfaces all curved to be concentric with the central shaft on which the spiders turn, substantially as and for the purpose herein specified.

In testimony whereof I affix my signature in presence of two witnesses.

CHARLES C. STUART.

Witnesses:
A. J. KING,
CHARLES S. KING.